United States Patent
Sun (10) Patent No.: US 9,166,987 B2
(45) Date of Patent: Oct. 20, 2015

(54) PREVENTING IDENTITY FRAUD FOR INSTANT MESSAGING

(71) Applicant: Tencent Technology (Shenzhen) Company Limited, Shenzhen, Guangdong (CN)

(72) Inventor: Xiao Sun, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 213 days.

(21) Appl. No.: 13/993,295

(22) PCT Filed: Apr. 25, 2013

(86) PCT No.: PCT/CN2013/074740
§ 371 (c)(1),
(2) Date: Jun. 11, 2013

(87) PCT Pub. No.: WO2014/172881
PCT Pub. Date: Oct. 30, 2014

(65) Prior Publication Data
US 2014/0325667 A1 Oct. 30, 2014

(30) Foreign Application Priority Data
Apr. 25, 2013 (WO) ................ PCT/CN2013/074740

(51) Int. Cl.
*H04L 29/06* (2006.01)
(52) U.S. Cl.
CPC .................................. *H04L 63/126* (2013.01)
(58) Field of Classification Search
None
See application file for complete search history.

(56) References Cited

U.S. PATENT DOCUMENTS

| | | | |
|---|---|---|---|
| 2004/0179037 A1* | 9/2004 | Blattner et al. | 345/751 |
| 2008/0109870 A1* | 5/2008 | Sherlock et al. | 726/1 |
| 2010/0180216 A1* | 7/2010 | Bates et al. | 715/757 |
| 2012/0185506 A1* | 7/2012 | Gomez Maturana et al. | 707/769 |

FOREIGN PATENT DOCUMENTS

| | | |
|---|---|---|
| CN | 1917484 | 2/2007 |
| CN | 101093531 | 12/2007 |
| WO | WO-2005124600 | 12/2005 |
| WO | WO-2007070612 | 6/2007 |

OTHER PUBLICATIONS

Riek et al, "The Age of Avatar Realism", Dec. 2010, IEEE Robotics & Automation Magazine, p. 37-42.*
Kay et al, "Cognitive cyber situational awareness using virtual worlds", 2011, IEEE International Multi-Disciplinary Conference on Cognitive Methods in Situation Awareness and Decision Support, p. 179-182.*
Barr et al, "Changing the Virtual Self", no date provided, p. 83-90.*
International Search Report for PCT International Application No. PCT/CN2013/074740, mailed Feb. 20, 2014.

* cited by examiner

*Primary Examiner* — Christopher Revak
(74) *Attorney, Agent, or Firm* — Blakely Sokoloff Taylor & Zafman LLP (57) ABSTRACT

A computer-implemented method for preventing identity fraud in instant messaging is provided in accordance with an aspect of the present disclosure. In the method, an instant message is received. Then, determine relationship between a sender and a receiver of the instant message, and determine whether key identifier of the sender has changed. Subsequently, inform the receiver about the change of the key identifier of the sender when the sender and the receiver have a preset type of relationship.

17 Claims, 9 Drawing Sheets

PREVENTING IDENTITY FRAUD FOR INSTANT MESSAGING

CLAIM OF PRIORITY

This application is a U.S. National Phase application under 35 U.S.C. §371 of International Application No. PCT/CN2013/074740, filed Apr. 25, 2013, entitled "PREVENTING IDENTITY FRAUD FOR INSTANT MESSAGING" the entire contents of which are incorporated herein by reference.

TECHNICAL FIELD

The present disclosure relates to instant messaging, and more particularly to identity fraud prevention for instant messaging.

BACKGROUND

Instant messaging (IM) is a form of communication over a network (such as the Internet) that offers quick transmission of messages from sender to receiver. In push mode between two or more people using personal computers (PCs), mobile phones, smart phones or other devices, instant messaging basically offers real-time or quasi real time direct written language-based online chat. It may address point-to-point communications as well as multicast communications from one sender to many receivers. More advanced instant messaging allows enhanced modes of communication, such as live voice or video calling, video chat and inclusion of hyperlinks to media.

Instant messaging application, such as Google Talk, Facebook Messenger, WhatsApp Messenger, LINE, KakaoTalk, and WeChat, can provide both text and voice communication. In addition to basic messaging, users can send each other images, video, audio media messages and make free Voice over Internet Protocol (VoIP) calls, and share diverse contents and information from photos, videos, voice messages, URL links to contact information. Both one-on-one chat and group chats are available over such as Wifi or 3G, and there are no limits to the number of friends to join in group chat. Instant messaging application lets users chat with friends on mobile, the main website or on a desktop computer. Instant messaging applications are cross-platform software. Some of the instant messaging applications are available for such as iOS, Microsoft Windows, Android, Blackberry, Bada OS, and Google Chrome OS (operating system).

WeChat, which can be literally called micro message, is a mobile phone text and voice messaging communication service developed by Tencent. The application was initially launched as Weixin, and re-branded as WeChat later. Clients are available for Android, iPhone, BlackBerry, Windows Phone, and Symbian platforms. WeChat is supported on such as WiFi, 2G, 3G, and 4G data networks. WeChat provides multimedia communication flexibility and convenience with text messaging, hold-to-talk voice messaging, broadcast (one-to-many) messaging, photo/video sharing, location sharing, and contact information exchange. User data can be protected via on-demand contact list backup and retrieval to/from a cloud-based service.

SUMMARY

In an aspect of the present disclosure, a computer-implemented method for preventing identity fraud in instant messaging is provided. The method includes: receiving an instant message; determining relationship between a sender and a receiver of the instant message; determining whether key identifier of the sender has changed; and informing the receiver about the change of the key identifier of the sender when the sender and the receiver have a preset type of relationship.

In an aspect of the present disclosure, a system for preventing identity fraud in instant messaging is provided. The system includes: memory; one or more processors; and one or more programs stored in the memory and configured for execution by the one or more processors, the one or more programs including instructions to: receive an instant message; determine relationship between a sender and a receiver of the instant message; determine whether key identifier of the sender has changed; and inform the receiver about the change of the key identifier of the sender when the sender and the receiver have a preset type of relationship.

In an aspect of the present disclosure, a computer readable storage medium storing one or more programs configured to be executed by a computer system is provided. The one or more programs include instructions to: receive an instant message; determine relationship between a sender and a receiver of the instant message; when the sender and the receiver have a preset type of relationship, determine whether key identifier of the sender has changed; and inform the receiver about the change of the key identifier of the sender when forwarding the instant message to the receiver.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In instant messaging, there are many ways for a user to add friends. The user cannot remember all his/her friends stored in a contact list. The present disclosure provides a method for helping instant messaging users to recognize the identity of a friend accurately, without mistaking the friend for another one.

Figure 1:
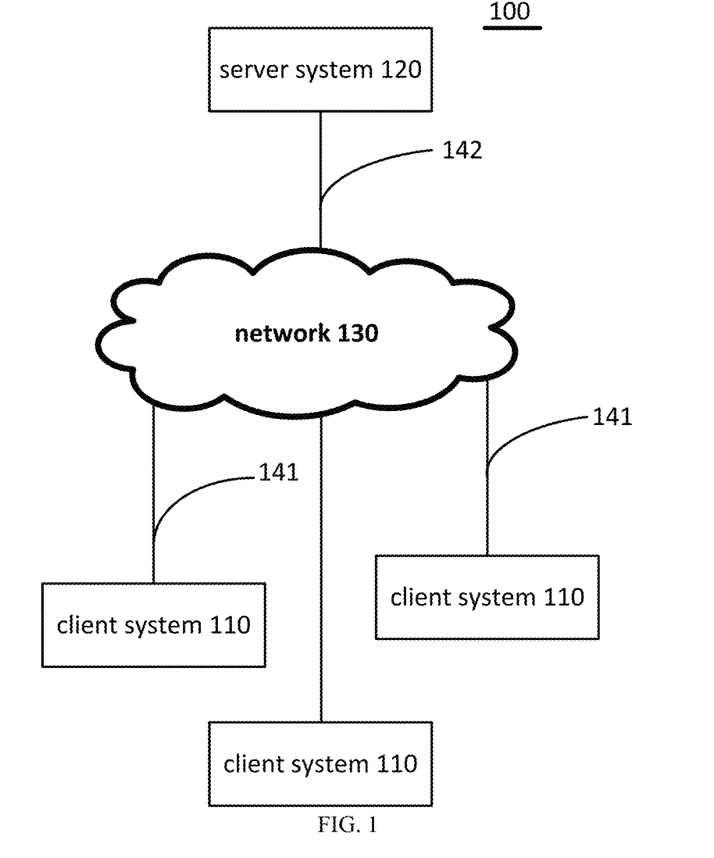
FIG. 1 is a block diagram illustrating a communications system 100 in accordance with an embodiment of the present disclosure.

Referring to FIG. 1, a communications system 100 is capable of delivering and exchanging data between multiple client systems 110, and a server system 120, such as an IM host, through a network 130. Specifically, the multiple client systems 110 access the network 130 via communications links 141, and the server system 120 accesses the network 130 via a communications link 142. The network 130 may be such as the Internet, other wide area networks, local area networks, metropolitan area networks, and so on. The communications links 141, 142 may be information transmission paths such as those provided by communication satellites, radio communications infrastructure and computer networks to connect two or more points. Such a communications system 100 may be available to users of IM service providers, such as, for example, Tencent QQ, Yahoo Messenger, Microsoft Messenger, WeChat, Facebook Messenger, and Google Talk.

The client system 110 may include communication software (e.g., an instant messaging client application) to enable users of the client system 110 to access the server system 120. In an example, the client system 110 may be a mobile device. The mobile device (also known as mobile communication terminal) may be a hand-held computing device including cell phones, laptops, smart phones, tablets, Personal Digital Assistant (PDA), and a telematics unit in vehicle (also called a car PC).

The server system 120 may support IM services irrespective of a user's network or Internet access. Thus, the server system 120 may allow users to send and receive instant messages, regardless of whether they have access to any particular Internet Service Provider (ISP). The server system 120 also may support associated services, such as administrative matters, advertising, directory services, chat, and interest groups related to instant messaging. The server system 120 has an architecture that enables devices (e.g., one or more servers) within the server system 120 to communicate with each other. In most common use, a server included in the server system 120 is a physical computer or a computer hardware system dedicated to run one or more computing services (as a host), to serve the needs of users of other nodes on a network. Depending on the computing services that it offers it could be an IM server, database server, file server, mail server, print server, web server, gaming server, or some other kind of server. To transfer data, the server system 120 employs one or more standard or exclusive IM protocols.

To access the server system 120 to begin an IM session in the implementation of FIG. 1, a client system 110 establishes a connection to the server system 120. Once a connection to the server system 120 has been established, the client system 110 may directly or indirectly transmit data to and access content from the server system 120. By accessing the server system 120, a first user can use the IM application to view whether particular users ("buddies") are on-line, exchange instant messages with particular buddies, participate in a group chat, trade files such as pictures, invitations or documents, find other buddies with similar interests, get customized information such as news and stock quotes, and search the Web.

In an implementation, instant messages sent between the client systems 110 are routed through the server system 120. In another implementation, instant messages sent between the client systems 110 are routed through a third party server (not shown in FIG. 1), and, in some cases, also are routed through the server system 120. In yet another implementation, instant messages are sent directly between the client systems 110.

Figure 2:
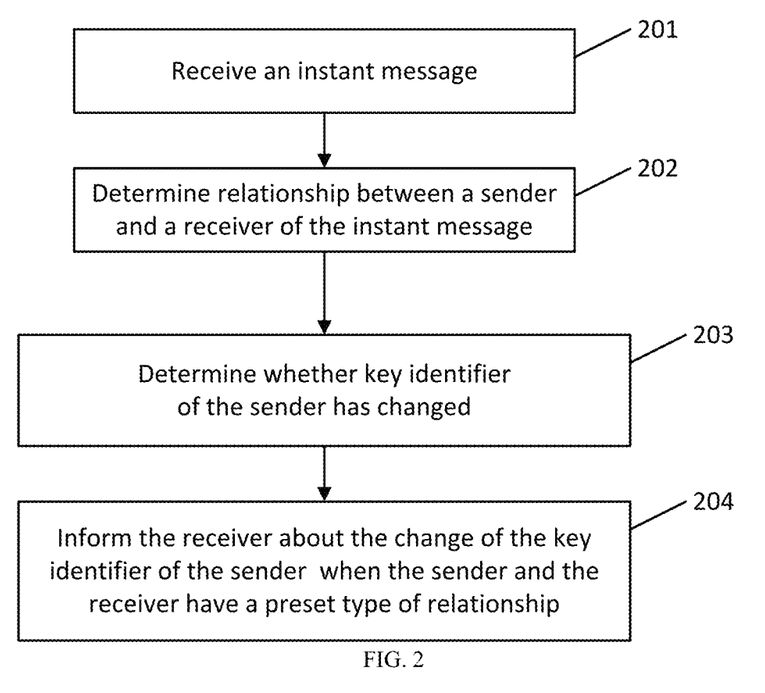
FIG. 2 is a flow diagram illustrating a method of preventing identity fraud for instant messaging according to an example of the present disclosure.

FIG. 2 is a flowchart illustrating a method of preventing identity fraud for instant messaging according to an embodiment of the present disclosure. In an example, the method is implemented by a server system 120 shown in FIG. 1.

At block 201, an instant message is received at the server system. At block 202, the server system determines relationship between a sender and a receiver of the instant message. Both the sender and the receiver are a client system shown in FIG. 1. In an example, the server system obtains information concerning the sender and the receiver from such as the instant message, and determines whether the sender has been added into a contact list of the receiver via a stranger channel. The information concerning the sender or the receiver may be an identifier of the sender or the receiver. When the sender has been added into the contact list via the stranger channel, it is determined that the sender and the receiver have a preset type of relationship. In an example, the preset type of relationship refers to a friend relationship established via a way deemed to be unsafe such as the stranger channel.

Specifically, the stranger channel may be a way of shaking mobile devices to add friends, or a way of collecting geographic information of nearby users to add friends, or a way of sending out a random message and waiting for a receiver. It can be seen that the stranger channel establishes a relationship for ordinary friends, not for close friends. In other words, an ordinary friend refers to a friend being added via a stranger channel. In an example, the stranger channel for adding friends may be location-based social plug-ins provided by the instant messaging application including 'Shake', 'Look Around', and 'Drift Bottle'. Specifically, 'Shake' is a way to connect two or more instant messaging users shaking phones simultaneously. 'Look Around' is a Location Based Service (LBS) to collect geographic information of other users nearby and select a friend from them. 'Drift Bottle' is a way to send out a random message (such as a voice or text message) like a real drift bottle, which will be received by an unknown person. After the random message is received, the unknown person becomes a friend of the user throwing out the drift bottle. It should be pointed out that the stranger channel is not limited to the above mentioned three ways. A way provided in the instant messaging application for adding friends that may be considered unsafe can be defined as a stranger channel. Alternatively, apart from a way of adding friends via group chat, WeChat name or number, QQ number, phone number, public account, or via scanning a two-dimensional code card, other ways to add friends may be considered as a stranger channel. Different from the preset type of relationship, a friend relationship established via such as group chat, WeChat name or number, QQ number, phone number, public account, or scanning a two-dimensional code card can be considered as a second type of relationship, and friends thus added may be a close friend. In an extreme case, all ways for adding friends may be defined as a stranger channel, and considered as the preset type of relationship.

The server system determines (at block 203) whether key identifier of the sender has changed. The sequence for performing blocks 202 and 203 is not limited. In an example, the server system may first determine the relationship between the sender and the receiver, and then determine whether key identifier of the sender has changed when the sender and the receiver have a preset type of relationship. In an example, the server system may first determine whether key identifier of the sender has changed, and then determine the relationship between the sender and the receiver when the key identifier has changed.

Besides delivering the instant message to the receiver, the server system informs (at block 204) the receiver about the change of the key identifier of the sender when the sender and the receiver have the preset type of relationship. Otherwise, if the key identifier does not change, the server system may take no action.

Specifically, the server system may retrieve profile of the sender stored in itself at block 203 to get avatar and/or name (or nickname) of the sender, and determine whether the avatar and/or name of the sender has changed. In another example, other personal information for indicating an IM user may be considered as a key identifier of the IM user.

In an example, the server system sends (block 204) an identity change message to the receiver when the key identifier of the sender has changed, and the receiver may display the identity change message on an interface (such as a screen of a mobile device).

In another example, the server system may compare (block 204) the avatar and/or name of the sender with those of one or more other friends of the receiver, and send an identity change alert to the receiver when the avatar and/or name of the sender and those of the one or more other friends of the receiver are similar. Specifically, the server system may compare the avatar and/or name of the sender with those of all the other friends recorded on the contact list of the receiver. Alternatively, the server system may compare the avatar and/or name of the sender with those of close friends or public accounts stored in the contact list of the receiver.

In this way, an instant messaging user may be aware of identity change of an ordinary friend, and sharpen his vigilance against the ordinary friend who has changed its key identifier. Hence, the IM user cannot easily be cheated by those ordinary friends who have a vicious intention or ulterior motive, thereby avoiding identity fraud and improving security of instant messaging.

Figure 3:
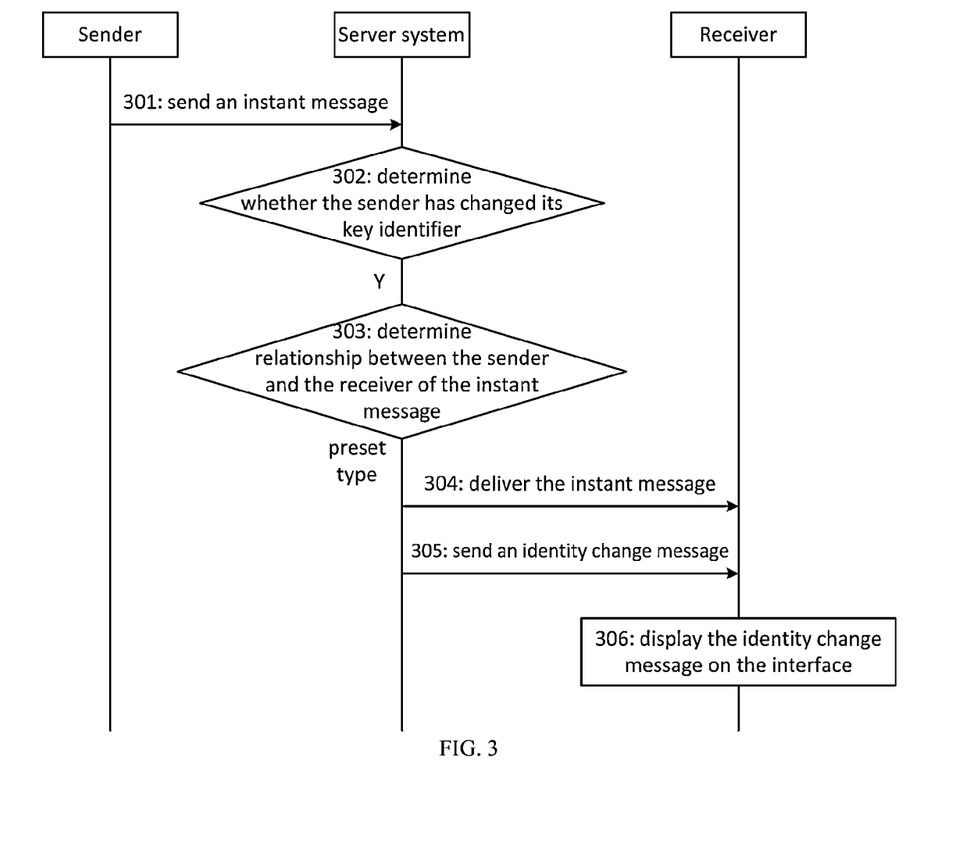
FIG. 3 shows an interaction among sender of an instant message, receiver of the instant message, and a server system for preventing identity fraud according to an embodiment of the present disclosure.

FIG. 3 shows an interaction among sender of an instant message, receiver of the instant message, and a server system for preventing identity fraud according to an embodiment of the present disclosure.

The sender sends out the instant message and the instant message is routed to the server system at step 301. At step 302, the server system determines whether the sender has changed its key identifier. The server system performs step 303 when the sender has changed its key identifier to determine relationship between the sender and the receiver of the instant message. When it is determined that the sender and the receiver become friends via a stranger channel, the server system may send an identity change message together with the instant message to the receiver (steps 304 and 305). The receiver may display (step 306) the identity change message on some area of the interface of the instant messaging application to notify its user.

Figure 4:
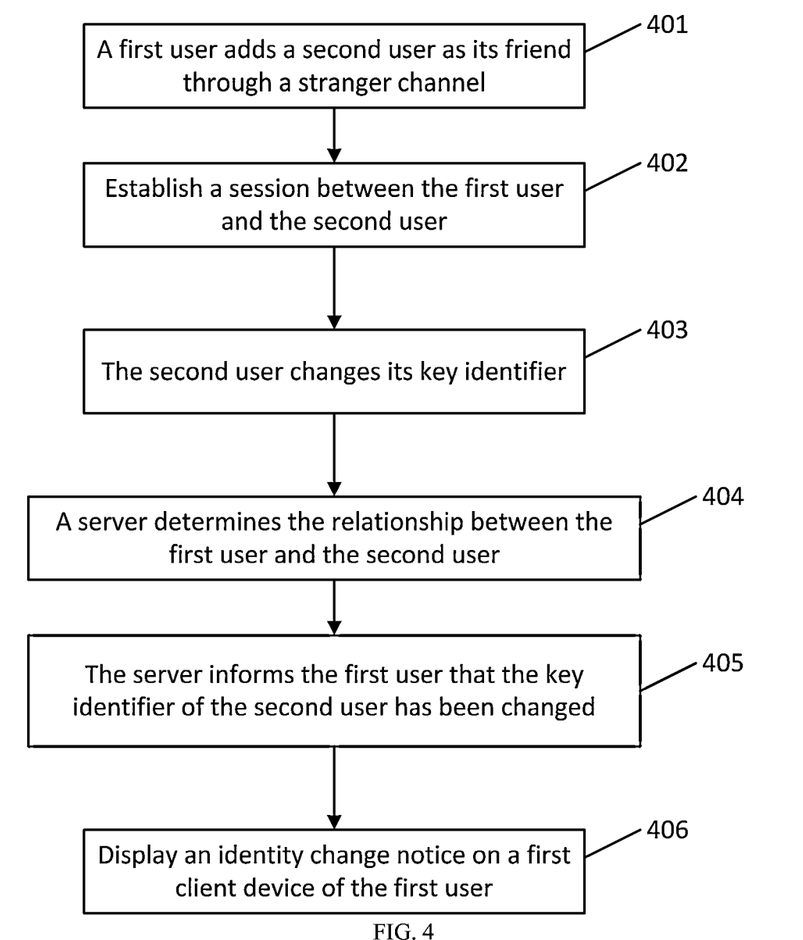
FIG. 4 is a flow diagram illustrating a method of preventing identity fraud for instant messaging according to an example of the present disclosure.

FIG. 4 is a flowchart illustrating a process of preventing identity fraud for instant messaging according to an embodiment of the present disclosure.

At block 401, a first user adds a second user as its friend through a stranger channel. The first or second user may use an instant messaging application installed in a mobile device such as a smart phone or a tablet to add friends. The mobile device including the instant messaging application may be called a client system.

At block 402, a session is established between the first user and the second user. The session is established by a server for supporting the instant messaging application (e.g., an instant messaging server) via the network. The session can be set up for a single chat, a group chat, etc.

At block 403, the second user changes its key identifier during the session. In an example, the key identifier of an instant messaging user may be its avatar or name.

At block 404, the server receives from the second user an instant message to be sent to the first user, and determines the relationship between the first user and the second user. In this scenario, the second user befriends the first user via a stranger channel. Therefore, block 405 is executed. Specifically, the server may determine whether the sender of the instant message is a friend of the receiver of the instant message added via a stranger channel. In an example, a label or tag is attached to a friend for indicating the preset type of relationship during the procedure of friend addition. Accordingly, the server can recognize the preset type of relationship via the label. In another example, a contact list of an instant messaging user is further divided into such as an ordinary friend section and a close friend section. The server may judge whether the sender is in the ordinary friend section or the close friend section. If the sender is in the ordinary friend section, it is determined that the sender and the receiver have a preset type of relationship. Thereafter, the server may notify the receiver of the identity change.

At block 405, the server informs the first user that the key identifier of the second user has been changed via an identity change notice. Further, the server may compare the changed key identifier of the second user with key identifiers of other friends of the first user, especially with that of a close friend or a public account. If they are similar, the server may provide an identity change alert having a stronger alert level than the identity change notice. Either the identity change alert or the identity change notice is a kind of identity change message.

At block 406, the identity change message is displayed on a client system of the first user, to draw the receiver's attention to identity change of the sender. In an example, the identity change message may be presented to the first user in the same form as an existing system notification message. In another example, the identity change message may have a new form different from the system notification message, which may disappear automatically after a short period of time. In yet another example, the identity change message may vanish after it is clicked by the IM user.

In other scenarios different from FIG. 4, the second user may not be a friend of the first user, or the second user becomes a friend of the first user via other channels different from the stranger channel. For example, the first user may add the second user into its contact list via the phone number of the second user. In this case, the server may decide that the first user and the second user do not have the preset type of relationship. Therefore, blocks 405 and 406 may not be executed.

Figure 5:
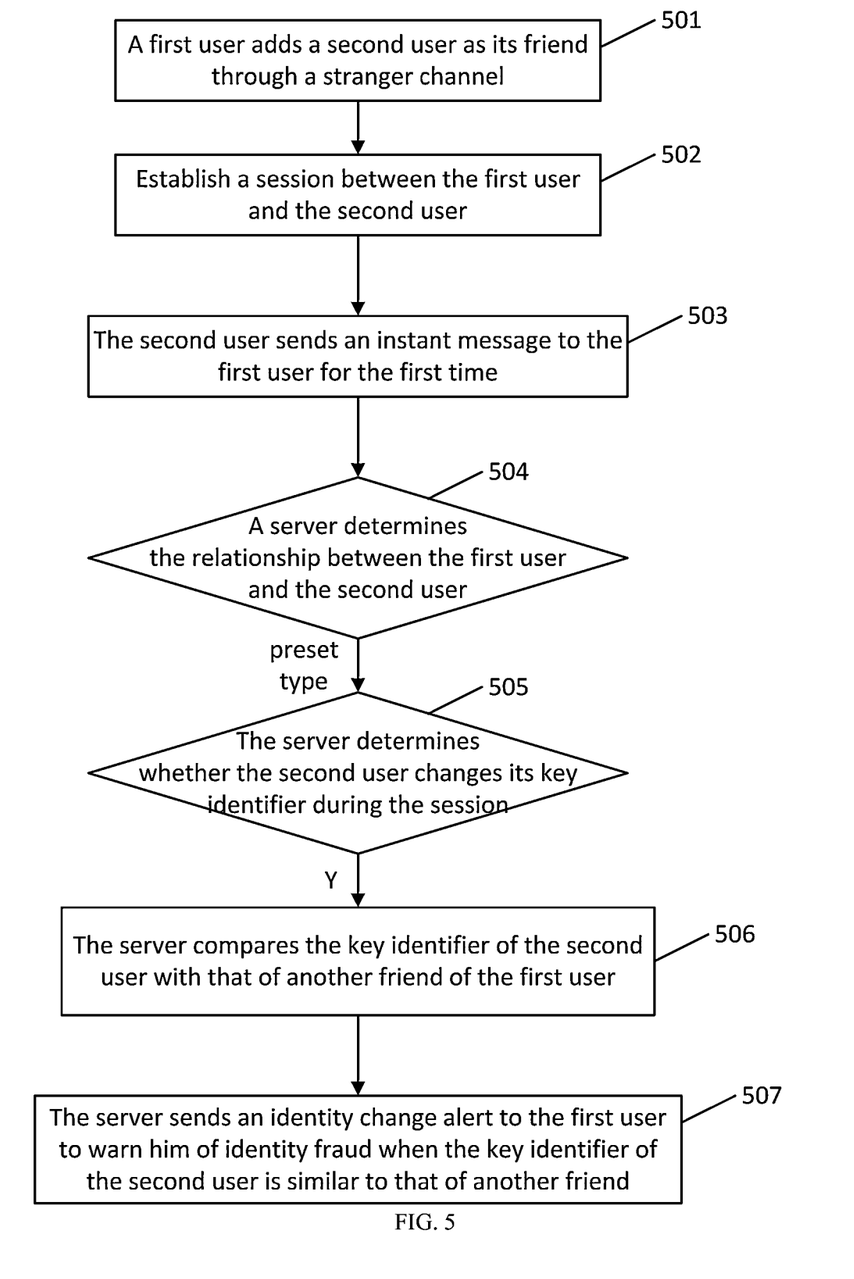
FIG. 5 is a flow diagram illustrating a method of preventing identity fraud for instant messaging according to an example of the present disclosure.

FIG. 5 is a flowchart illustrating a process of preventing identity fraud for instant messaging according to an embodiment of the present disclosure.

The operations of blocks 501-502 are the same as the operations of blocks 401-402 in FIG. 4, respectively. At block 503, the second user sends an instant message to the first user for the first time. In an example, the server determines whether the instant message is a first piece of instant message in a direction from the second user to the first user. If it is the first piece of instant message, following blocks (such as block 504 or 505) will be processed.

At block 504, the server determines the relationship between the first user and the second user. When it is determined that the first user and the second user have a preset type of relationship, the server determines (block 505) whether the second user has changed its key identifier. Specifically, the server may search the profile of the second user to find whether the second user has changed its key identifier. For example, the server may decide whether an avatar of the second user has ever been changed from registration of the second user to delivery of the instant message at block 503. For another example, the server may decide whether the avatar of the second user has been changed after the second user befriends the first user.

In another example, block 505 may first be executed to determine whether the second user has changed its key identifier. When the key identifier has been changed, block 504 may then be executed.

Thereafter, the server compares (block 506) the key identifier currently used by the second user with that of another friend of the first user. Typically, the server may compare the key identifier of the second user with that of a close friend or public account of the first user. In an implementation, image similarity of avatars of the second user and another friend are compared. In another implementation, string comparison on names of the second user and another friend is performed.

At block 507, the server sends an identity change alert to the first user to warn him/her of possible identity fraud when the key identifier of the second user is similar to that of another friend. The identity change alert may have a different design from a system notification message to highlight information presented in the identity change alert.

With the above process, when a friend added via a stranger channel changes its key identifier to pretend to be a close friend of an instant messaging user, the server may monitor this situation and give a warning to inform the IM user of the identity fraud. Accordingly, the security of instant messaging may be improved.

Figure 6:
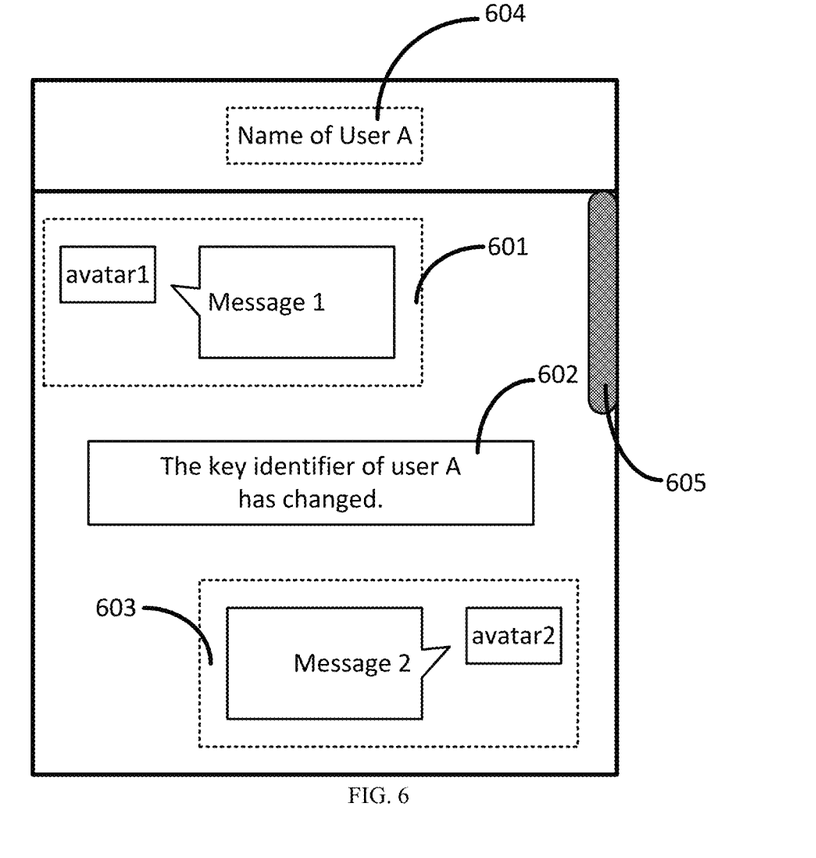
FIG. 6 is a schematic diagram illustrating an interface of a session established between user A and user B.

FIG. 6 is a schematic diagram illustrating an interface of a session established between user A and user B. In FIG. 6, user A has avatar 1, and user B has avatar 2. The interface is shown in a client device of user B. Name of user A 604 is displayed on the title of the interface. Scrollbar 605 appears on a side of the session interface. It can be seen from FIG. 6 that Message 1 601 is the first piece of instant message sent from user A to user B. Therefore, an identity change message 602 is inserted into the session by a backend server. In some implementations, the identity change message may be an identity change notice with the same form as a system notification message. That is, the identity change notice may have white text on gray background. In some implementations, the identity change message may be an identity change alert having a different pattern. For example, text color in the identity change alert may have a high contrast in relation to background color, e.g., black text with yellow background, or red text with white background. It should be noted that the identity change message 602 may not appear on the session interface of a client device of user A.

Similarly, when user B sends Message 2 603 to user A in response to Message 1, the backend server may check identity change of user B for user A, and push an identity change message to user A as a warning if needed.

Figure 7:
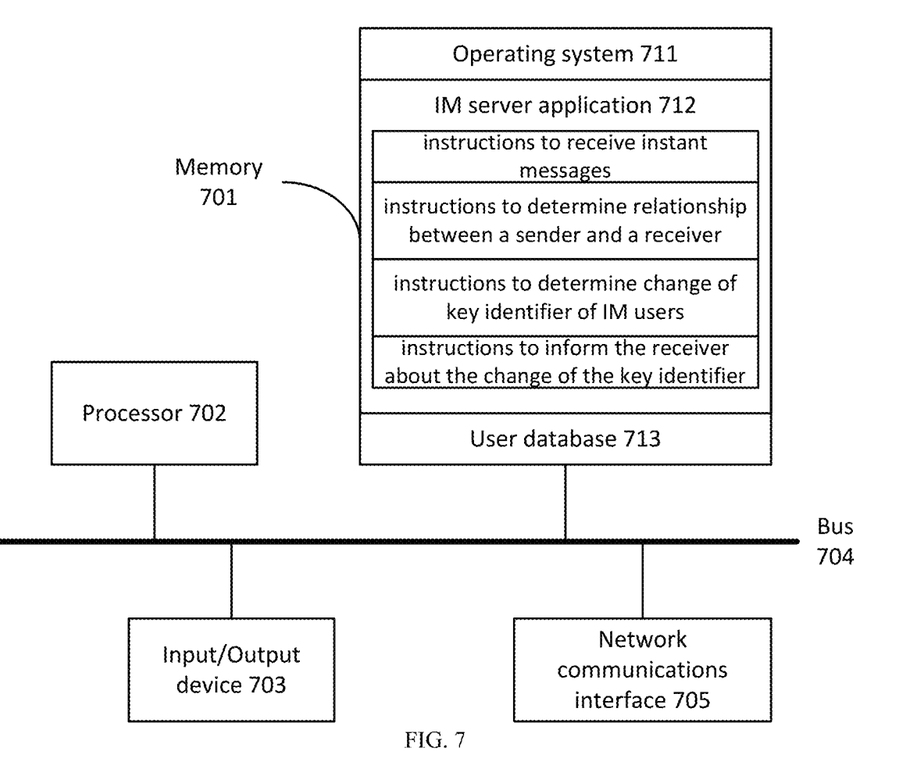
FIG. 7 is a block diagram illustrating a server system in accordance with an embodiment of the present disclosure.

FIG. 7 is a block diagram illustrating a server system in accordance with an embodiment of the present disclosure. The server system typically includes a memory 701, a processor 702, an input/output device 703, a bus 704, and a network communications interface 705. In an example, the server system may include multiple devices connected via such as an intranet or a bus, or the server system may be a device.

The memory 701 stores instructions for performing operations described in such as FIGS. 2-5. In an example, the memory 701 includes high-speed random access memory, such as DRAM, SRAM, DDR RAM or other random access solid state memory devices. In an example, the memory 701 may include non-volatile memory, such as one or more magnetic disk storage devices, optical disk storage devices, flash memory devices, or other non-volatile solid state storage devices. In an example, the memory 701 may optionally include one or more storage devices remotely located from the processor 702. Specifically, the memory 701 may include an operating system 711, IM server application 712 and user database 713. The operating system 711 includes procedures for handling various basic system services and for performing hardware dependent tasks. The user database 713 stores information such as profile of IM users. The IM server application 712 includes one or more programs for preventing identity fraud described in such as FIGS. 2-5. Specifically, the one or more programs include: instructions to receive instant message, instructions to determine relationship between a sender and a receiver, instructions to determine change of key identifier of users, and instructions to inform users about the change of the key identifier. The processor 702 executes the instructions stored in the memory 701.

The input/output device 703 can be such as a keyboard, a mouse, or a display component such as a touch screen. The bus 704 is a subsystem that transfers data between components inside the server system. Specifically, the bus 704 can be parallel electrical wires with multiple connections, or any physical arrangement that provides the same logical functionality as a parallel electrical wire. Further, the bus 704 may include circuitry (sometimes called a chipset) that interconnects and controls communications between system components. The network communications interface 705 connects the server system into the network 130 shown in FIG. 1.

Figure 8:
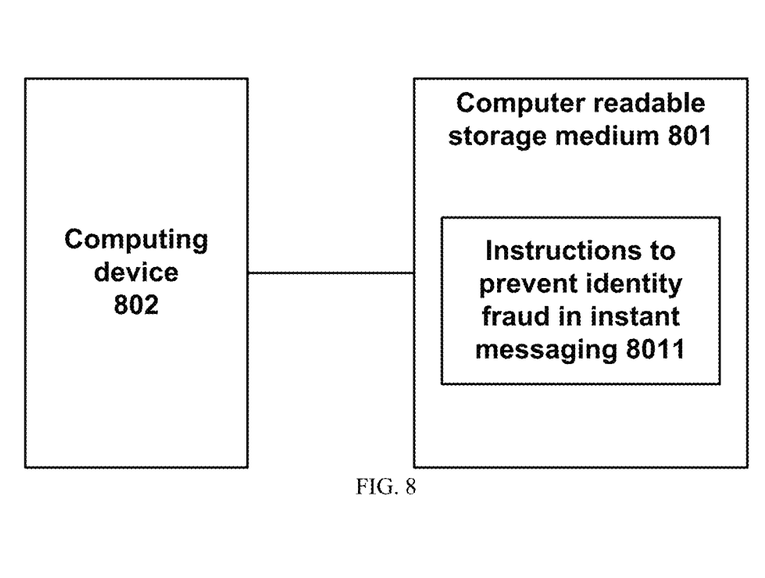
FIG. 8 is a block diagram illustrating computer readable storage medium for storing instructions to prevent identity fraud in instant messaging according to an embodiment of the present disclosure.

A computer readable storage medium containing instructions for execution by at least one processor is also presented in the present disclosure. FIG. 8 illustrates a computer readable storage medium 801 storing instructions to prevent identity fraud in instant messaging 8011. The instructions 8011 can be read by a computing device 802 to perform part or all of the operations described in such as FIGS. 2-5. Specifically, the computer readable storage medium 801 may be one or more magnetic disk storage devices, flash memory devices, or other non-volatile solid state memory devices.

Figure 9:
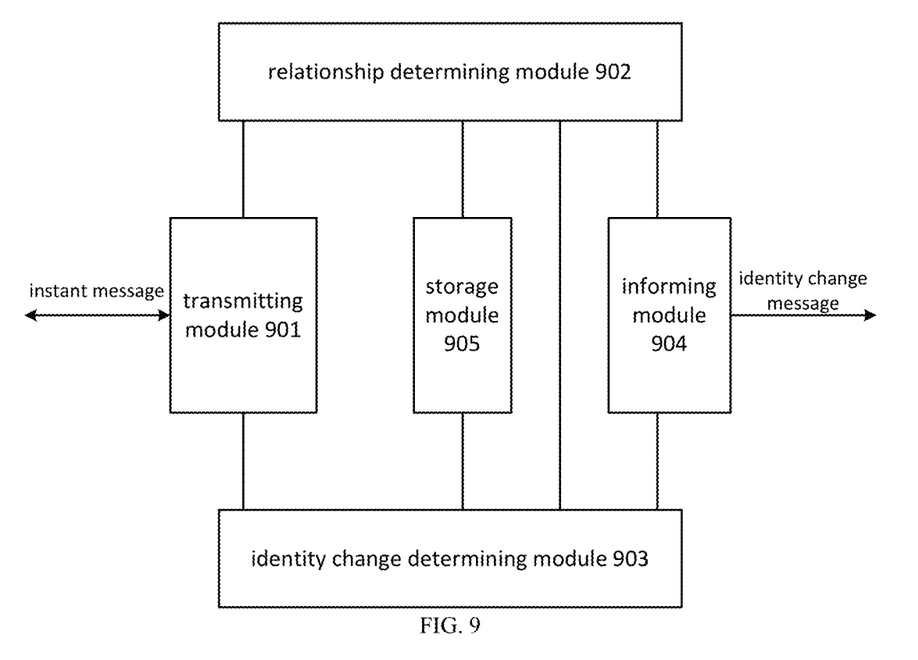
FIG. 9 is a block diagram illustrating a server system in accordance with an embodiment of the present disclosure.

FIG. 9 is a block diagram illustrating a server system in accordance with an embodiment of the present disclosure. The server system includes a transmitting module 901, a relationship determining module 902, an identity change determining module 903, an informing module 904, and a storage module 905.

The transmitting module 901 receives an instant message from an instant messaging user, and delivers the instant message to corresponding receiver. The relationship determining module 902 determines relationship between a sender and a receiver of the instant message. The identity change determining module 903 determines whether key identifier of the sender has changed. The informing module 904 informs the receiver about the change of the key identifier of the sender when the sender and the receiver have a preset type of relationship. That is, when the two conditions set in both the relationship determining module 902 and the identity change determining module 903 are met, the informing module 904 may additionally send an identity change message to the receiver. Specifically, the relationship determining module 902 or the identity change determining module 903 may inquire the storage module 905 for information of IM users.

Figure 10:
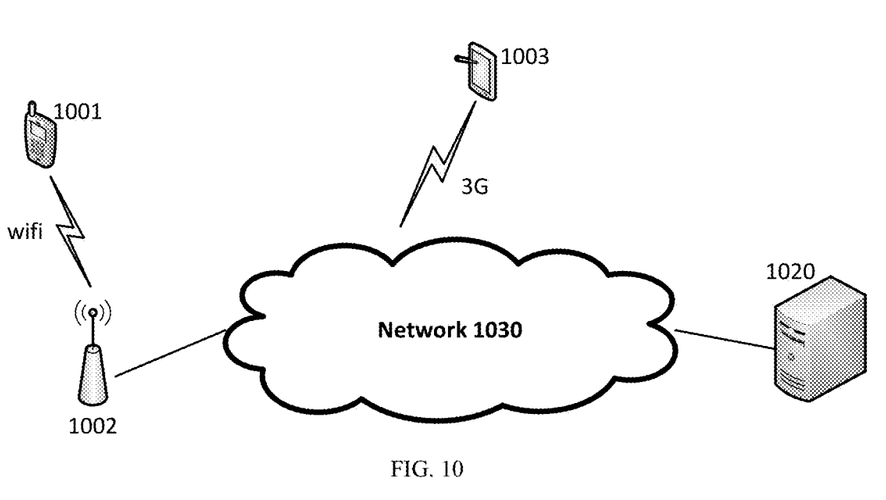
FIG. 10 shows a scenario for preventing identity fraud in WeChat platform according to an embodiment of the present disclosure.

FIG. 10 shows a scenario for preventing identity fraud in WeChat platform according to an embodiment of the present disclosure. A smartphone 1001 accesses a network 1030 via an access pint 1002. A tablet 1003 accesses the network 1030 over 3G. A WeChat server 1020 is provided for supporting such as instant messaging service for WeChat users. When user A using the smartphone 1001 initiates an instant messaging session to user B using the tablet 1003, the WeChat server 1020 performs operations described in such as FIGS. 2-5. As such, WeChat provides a secure social networking platform that emphasizes user security and offers diverse protection for its users.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making a computing device implement the method recited in the examples of the present disclosure.

What is claimed is:

1. A computer-implemented method for preventing identity fraud in instant messaging, comprising:
receiving an instant message;
determining relationship between a sender and a receiver of the instant message;
determining whether key identifier of the sender has changed, wherein the key identifier of the sender is personal information for indicating the sender; and
informing the receiver about the change of the key identifier of the sender when the sender and the receiver have a preset type of relationship.

2. The method according to claim 1, wherein determining the relationship between the sender and the receiver of the instant message comprises:
obtaining information concerning the sender and the receiver of the instant message;
determining whether the sender has been added into a contact list of the receiver via a stranger channel; and
deciding that the sender and the receiver have the preset type of relationship when the sender has been added into the contact list via the stranger channel.

3. The method according to claim 2, wherein the stranger channel comprises at least one of the following ways:
shaking mobile devices to add friends;
collecting geographic information of nearby users to add friends; and
sending out a random message and waiting for a receiver.

4. The method according to claim 1, wherein determining whether the key identifier of the sender has changed comprises:
retrieving profile of the sender, and determining whether avatar and/or name of the sender has changed.

5. The method according to claim 4, wherein informing the receiver about the change of the key identifier of the sender comprises:
comparing the avatar and/or name of the sender with those of one or more other friends of the receiver; and
sending an identity change alert to the receiver when the avatar and/or name of the sender and those of the one or more other friends of the receiver are similar.

6. The method according to claim 1, wherein informing the receiver about the change of the key identifier of the sender comprises: sending an identity change message to the receiver when the key identifier of the sender has changed.

7. The method according to claim 6, further comprising:
displaying the identity change message on an interface of the receiver.

8. A system for preventing identity fraud in instant messaging, comprising:
memory;
one or more processors; and
one or more programs stored in the memory and configured for execution by the one or more processors, the one or more programs including instructions to:
receive an instant message;
determine relationship between a sender and a receiver of the instant message;
determine whether key identifier of the sender has changed, wherein the key identifier of the sender is personal information for indicating the sender; and
inform the receiver about the change of the key identifier of the sender when the sender and the receiver have a preset type of relationship.

9. The system according to claim 8, wherein the one or more programs include instructions to:
obtain information concerning the sender and the receiver of the instant message;
determine whether the sender has been added into a contact list of the receiver via a stranger channel; and
decide that the sender and the receiver have the preset type of relationship when the sender has been added into the contact list via the stranger channel.

10. The system according to claim 8, wherein the one or more programs include instructions to:
retrieve profile of the sender, and determine whether avatar and/or name of the sender has changed.

11. The system according to claim 8, wherein the one or more programs include instructions to: send an identity change message to the receiver when the key identifier of the sender has changed.

12. The system according to claim 10, wherein the one or more programs include instructions to:
- compare the avatar and/or name of the sender with those of one or more other friends of the receiver; and
- send an identity change alert to the receiver when the avatar and/or name of the sender and those of the one or more other friends of the receiver are similar.

13. A non-transitory computer readable storage medium storing one or more programs configured to be executed by a computer system, the one or more programs comprising instructions to:
- receive an instant message;
- determine relationship between a sender and a receiver of the instant message;
- when the sender and the receiver have a preset type of relationship, determine whether key identifier of the sender has changed, wherein the key identifier of the sender is personal information for indicating the sender; and
- inform the receiver about the change of the key identifier of the sender when forwarding the instant message to the receiver.

14. The non-transitory computer readable storage medium according to claim 13, wherein the one or more programs include instructions to:
- obtain information concerning the sender and the receiver of the instant message;
- determine whether the sender has been added into a contact list of the receiver via a stranger channel; and
- decide that the sender and the receiver have the preset type of relationship when the sender has been added into the contact list via the stranger channel.

15. The non-transitory computer readable storage medium according to claim 13, wherein the one or more programs include instructions to:
- retrieve profile of the sender, and determine whether avatar and/or name of the sender has changed.

16. The non-transitory computer readable storage medium according to claim 13, wherein the one or more programs include instructions to: send an identity change message to the receiver when the key identifier of the sender has changed.

17. The non-transitory computer readable storage medium according to claim 15, wherein the one or more programs include instructions to:
- compare the avatar and/or name of the sender with those of one or more other friends of the receiver; and
- send an identity change alert to the receiver when the avatar and/or name of the sender and those of the one or more other friends of the receiver are similar.

\* \* \* \* \*